US012255795B2

(12) United States Patent
Liu (10) Patent No.: US 12,255,795 B2
(45) Date of Patent: *Mar. 18, 2025

(54) DEVICE AND METHOD FOR ACHIEVING IMPROVED NETWORK SPEED TEST RESULT BY PREVENTING TRANSMISSION CONTROL PROTOCOL PACKETS FROM BEING RE-TRANSMITTED

(71) Applicant: Airoha Technology (Suzhou) Limited, Suzhou (CN)

(72) Inventor: Tao Liu, Suzhou (CN)

(73) Assignee: Airoha Technology (Suzhou) Limited, Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,695

(22) Filed: Aug. 1, 2023

(65) Prior Publication Data

US 2024/0250889 A1    Jul. 25, 2024

(30) Foreign Application Priority Data

Jan. 20, 2023    (CN) .......................... 202310072279.3

(51) Int. Cl.
| | | |
|---|---|---|
| *H04L 43/08* | (2022.01) | |
| *H04L 43/10* | (2022.01) | |
| *H04L 43/50* | (2022.01) | |
| *H04L 47/193* | (2022.01) | |

(52) U.S. Cl.
CPC .............. *H04L 43/08* (2013.01); *H04L 43/10* (2013.01); *H04L 43/50* (2013.01); *H04L 47/193* (2013.01)

(58) Field of Classification Search
CPC . H04L 41/5067; H04L 43/0888; H04L 43/16; H04L 65/80; H04L 43/04; H04L 43/08; H04L 43/10; H04L 43/50
See application file for complete search history.

(56) References Cited

U.S. PATENT DOCUMENTS

| | | | | |
|---|---|---|---|---|
| 6,076,113 | A * | 6/2000 | Ramanathan | ......... H04L 47/193 709/224 |
| 7,907,613 | B1 * | 3/2011 | Chiabaut | ............... H04L 1/1635 714/748 |
| 9,060,047 | B2 * | 6/2015 | Bhatia | .................... H04M 7/006 |
| 11,018,701 | B2 * | 5/2021 | Wang | .................. H04L 43/0841 |
| 11,516,274 | B2 * | 11/2022 | Sawabe | ................... H04L 43/16 |

(Continued)

FOREIGN PATENT DOCUMENTS

| | | |
|---|---|---|
| CN | 106878107 A | 6/2017 |
| CN | 108768789 A | 11/2018 |

(Continued)

*Primary Examiner* — David R Lazaro
(74) *Attorney, Agent, or Firm* — Winston Hsu (57) ABSTRACT

A computer device includes a network interface circuit, a storage device, and a processor. The network interface circuit is used to receive a first transmission control protocol (TCP) packet from another computer device, wherein the first TCP packet include a session layer content. The storage device is used to store a program code. The processor is used to load and execute the program code to perform the following operation: computing a network speed of a network used by the computer device according to information carried by the session layer content.

20 Claims, 4 Drawing Sheets

(56) References Cited

U.S. PATENT DOCUMENTS

| | | | |
|---|---|---|---|
| 2003/0149785 A1* | 8/2003 | Gerla | H04L 47/37 709/232 |
| 2003/0161265 A1* | 8/2003 | Cao | H04L 43/50 370/229 |
| 2006/0112168 A1* | 5/2006 | Albers | H04L 1/1848 709/213 |
| 2011/0072152 A1* | 3/2011 | Lee | H04L 47/266 709/235 |
| 2011/0307577 A1 | 12/2011 | McDaniel | |
| 2012/0243426 A1* | 9/2012 | Matsui | H04L 1/1887 370/252 |
| 2013/0229916 A1* | 9/2013 | Isobe | H04L 47/16 370/230 |
| 2014/0317288 A1* | 10/2014 | Krueger | H04L 65/60 709/224 |
| 2015/0381505 A1* | 12/2015 | Sundararaman | H04L 47/25 370/235 |
| 2019/0230017 A1* | 7/2019 | Wolf | H04L 43/10 |
| 2020/0329284 A1* | 10/2020 | Denoual | H04L 69/321 |
| 2023/0344742 A1* | 10/2023 | Wolf | H04L 43/20 |
| 2024/0098155 A1* | 3/2024 | Sze | H04L 47/2408 |
| 2024/0250889 A1* | 7/2024 | Liu | H04L 43/10 |
| 2024/0251028 A1* | 7/2024 | Liu | H04L 47/32 |

FOREIGN PATENT DOCUMENTS

| | | |
|---|---|---|
| CN | 108880938 A | 11/2018 |
| WO | 2021/244415 A1 | 12/2021 |

* cited by examiner

DEVICE AND METHOD FOR ACHIEVING IMPROVED NETWORK SPEED TEST RESULT BY PREVENTING TRANSMISSION CONTROL PROTOCOL PACKETS FROM BEING RE-TRANSMITTED

BACKGROUND OF THE INVENTION

1. Field of the Invention

The present invention relates to network communications between different computer devices, and more particularly, to an device and method for achieving an improved network speed test result by preventing transmission control protocol (TCP) packets from being re-transmitted.

2. Description of the Prior Art

TCP is a protocol belonging to the transport layer, and is also an end-to-end transmission protocol (also called a host-to-host or progress-to-progress transmission protocol). In other words, computer devices at both ends of TCP can communicate with each other to ensure the integrity of the transmitted data and provide control of the transmission rate, where these actions involve communications between the computer devices at both ends only, and have nothing to do with any nodes located between the computer devices at both ends, such as router(s) or switch(es). TCP ensures integrity and reliability of TCP packets transmitted over the network through two mechanisms, including acknowledgement and re-transmission. Hence, the overall process of TCP packet transmission will be less efficient, but it can ensure that TCP packets are correctly transmitted from a transmit (TX) end to a receive (RX) end. However, for certain applications, such a feature is not necessary. For example, for an application of network speed testing, an optical network unit (ONU) can run a hypertext transfer protocol (HTTP) client to visit an HTTP server on Internet for measuring a network speed. As the network becomes more and more popular, the user pays attention to not only the download rate but also the upload rate. Therefore, both of the user and the network operator need to test the upload rate of the network at user's home. Since HTTP belongs to the application layer which is stacked above the transport layer, TCP at the transport layer is therefore responsible for ensuring that the data can be delivered to the destination correctly. When the RX end discovers packet loss, it will request the TX end to perform TCP packet re-transmission. However, when the latency on the network is greater, that is, the time difference between sending a TCP packet from the TX end and receiving an acknowledgement (ACK) packet from the RX end (also known as the round-trip time (RTT)) is larger, the percentage of TCP packet loss increases, which at the same time reduces the packet exchange efficiency between the TX end and the RX end. As a result, if the RTT is larger, the TCP performance will be lower, which makes it impossible to measure the actual upload rate of the network at user's home.

SUMMARY OF THE INVENTION

One of the objectives of the claimed invention is to provide a device and method for achieving an improved network speed test result by preventing transmission control protocol (TCP) packets from being re-transmitted.

According to a first aspect of the present invention, an exemplary computer device is disclosed. The exemplary computer device includes a network interface circuit, a storage device, and a processor. The network interface circuit is arranged to receive a first TCP packet from another computer device, wherein the first TCP packet comprises a session layer content. The storage device is arranged to store a program code. The processor is arranged to load and execute the program code to perform following operation: computing a network speed of a network used by the computer device according to information carried by the session layer content.

According to a second aspect of the present invention, an exemplary computer device is disclosed. The exemplary computer device includes a network interface circuit, a storage device, and a processor. The network interface circuit is arranged to sequentially receive a first TCP packet and another first TCP packet from another computer device, wherein the first TCP packet and the another first TCP packet have discontinuous sequence numbers. The storage device is arranged to store a program code. The processor is arranged to load and execute the program code to perform following operation: in response to receiving the another first TCP packet, instructing the network interface circuit to transmit a second TCP packet to the another computer device, wherein the second TCP packet is an acknowledgement (ACK) packet corresponding to the another first TCP packet.

According to a third aspect of the present invention, an exemplary TCP packet processing method employed by a computer device is disclosed. The exemplary TCP packet processing method includes: receiving a first packet from another computer device, wherein the first TCP packet comprises a session layer content; and computing a network speed of a network used by the computer device according to information carried by the session layer content.

According to a fourth aspect of the present invention, an exemplary TCP packet processing method employed by a computer device is disclosed. The exemplary TCP packet processing method includes: sequentially receiving a first TCP packet and another first TCP packet from another computer device, wherein the first TCP packet and the another first TCP packet have discontinuous sequence numbers; and in response to receiving the another first TCP packet, transmitting a second TCP packet to the another computer device, wherein the second TCP packet is an acknowledgement (ACK) packet corresponding to the another first TCP packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
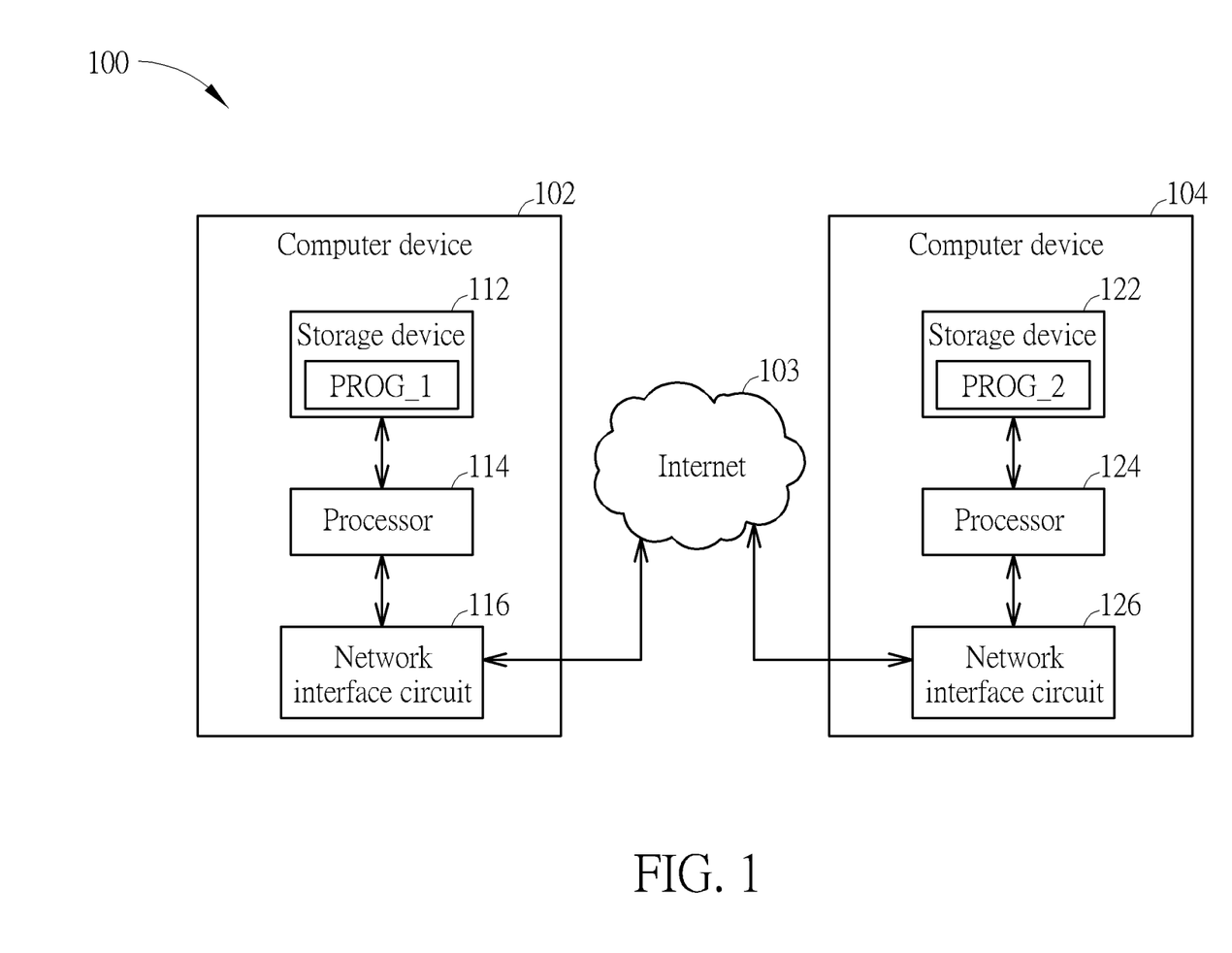
FIG. 1 is a diagram illustrating a network system according to an embodiment of the present invention.

FIG. 1 is a diagram illustrating a network system according to an embodiment of the present invention. The network system 100 includes a plurality of network devices (e.g., computer devices 102 and 104). The computer devices 102 and 104 may perform data exchange over Internet 103. For example, the computer device 102 may act as a client, and the computer device 104 may act as a server. The computer device 102 includes a storage device 112, a processor 114 and a network interface circuit 116. It should be noted that only the components pertinent to the present invention are illustrated in FIG. 1. In practice, the computer device 102 may include additional components to achieve other functions. The storage device 112 may be a memory or any component with data storage capability, and may be used to store a program code PROG_1. For example, the program code PROG_1 may include a program code of an operating system (OS) and a program code of an application (e.g., network speed test software (client edition)). The processor 114 may be used to load and execute the program code PROG_1 to control operations of the computer device (e.g., client) 102. For example, operations that are related to the computer device (e.g., client) 102 and included in the TCP packet processing method proposed by the present invention may be realized by the program code PROG_1 running on the processor 114. The network interface circuit 116 includes hardware of the transmit (TX) circuit and the receive (RX) circuit, and can be used to access the Internet 103. For example, the computer device 102 may be connected to the Internet 103 via the network provided by the network operator.

The computer device 104 includes a storage device 122, a processor 124 and a network interface circuit 126. It should be noted that only the components pertinent to the present invention are illustrated in FIG. 1. In practice, the computer device 104 may include additional components to achieve other functions. The storage device 122 may be a memory or any component with data storage capability, and may be used to store a program code PROG_2. For example, the program code PROG_2 may include a program code of an OS and a program code of an application (e.g., network speed test software (server edition)). The processor 124 may be used to load and execute the program code PROG_2 to control operations of the computer device (e.g., server) 104. For example, operations that are related to the computer device (e.g., server) 104 and included in the TCP packet processing method proposed by the present invention may be realized by the program code PROG_2 running on the processor 124. The network interface circuit 126 includes hardware of the TX circuit and the RX circuit, and can be used to access the Internet 103. For example, the computer device 104 may be connected to the Internet 103 via the network provided by the network operator.

Generally speaking, all network devices can communicate with each other due to using the same series of protocol layers. When a source network device transmits a packet to a destination network device, the packet has to traverse a series of protocol layers at the source network device. When the packet arrives at the destination network device, it has to traverse the same series of protocol layers at the destination network device. When the packet moves to a lower protocol layer, the conversion applied to the packet includes encapsulation. Encapsulation means that the original packet is encapsulated by a header and then becomes a larger packet. Each protocol layer performs encapsulation for adding specific information of the protocol layer to the packet. Similarly, when the packet moves to an upper protocol layer, the header is removed by a so-called de-encapsulation process. In this embodiment, the processor 114/124 can execute the program code PROG_1/PROG_2 (e.g., program code of the OS that is a part of the program code PROG_1/PROG_2) to deal with encapsulation and de-encapsulation. In addition, the processor 114/124 can further execute the program code PROG_1/PROG_2 (e.g., program code of the network speed test software that is a part of the program code PROG_1/PROG_2) to deal with a specific application (e.g., network speed test), where data of the specific application can be transmitted and received via the physical network interface provided by the network interface circuit 116/126.

Figure 2:
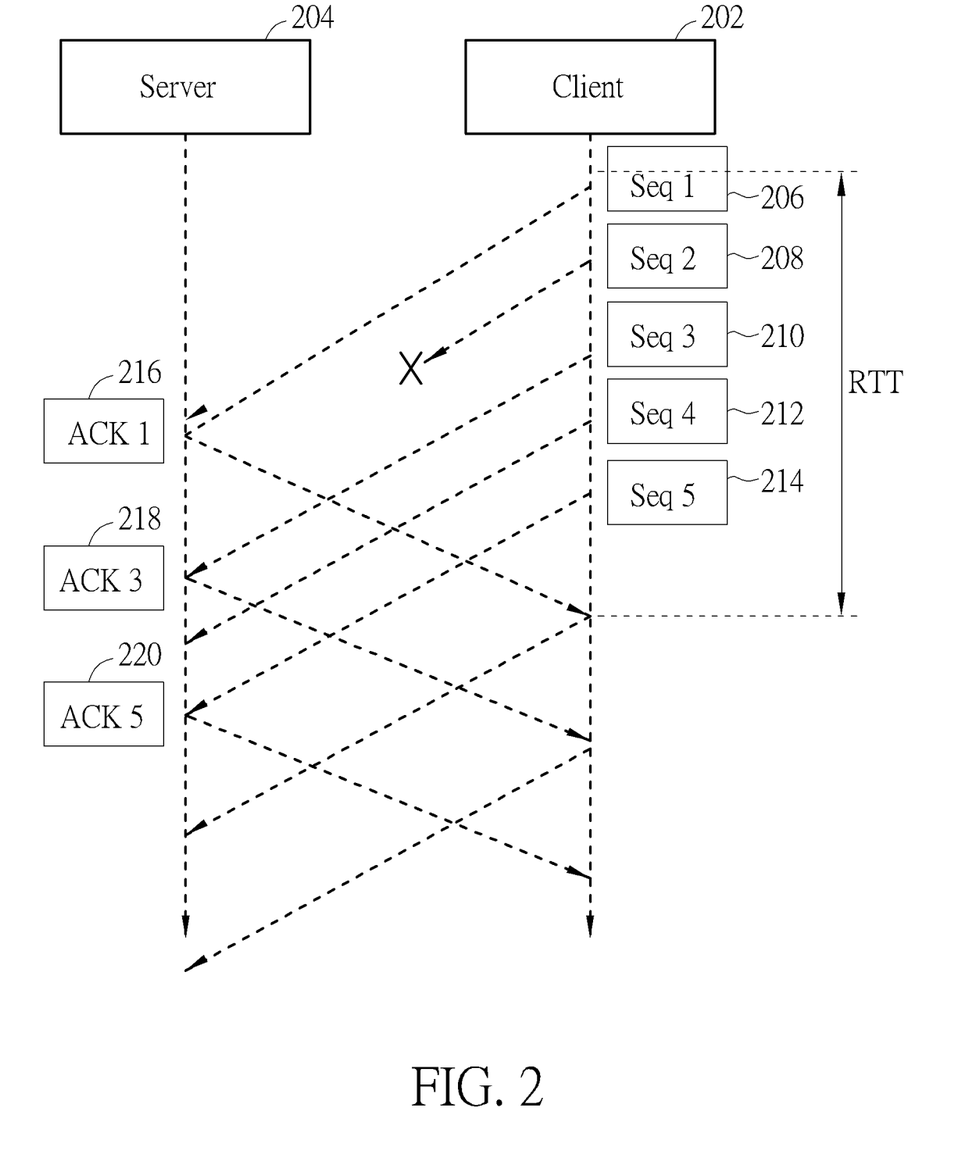
FIG. 2 is a sequence diagram illustrating a modified TCP flow according to an embodiment of the present invention.

Since the network speed test does not care about integrity of data contents, there is no need to rely on the re-transmission mechanism provided by a normal TCP flow for ensuring integrity of TCP packets transmitted over the network. Based on such observation, the present invention proposes a modified TCP flow for the network speed test application (which at least includes an upload rate test), which can prevent the TCP performance from being degraded by the TCP re-transmission mechanism. Please refer to FIG. 2. FIG. 2 is a sequence diagram illustrating a modified TCP flow according to an embodiment of the present invention. The client (e.g., HTTP client) 202 may be the computer device 102 shown in FIG. 1, and the server (e.g., HTTP server) 204 may be the computer device 104 shown in FIG. 1. The processor 114 of the client 202 may execute the program code PROG_1 (e.g., program code of the network speed test software (client edition) that is a part of the program code PROG_1) to start the network speed test. After a link is established between the client 202 and the server 204, the client 202 starts to perform data transmission. To achieve flow control, the client 202 may transmit TCP packets according to a send window, and the server 204 may receive TCP packets according to a receive window. As shown in FIG. 2, the processor 114 of the client 202 may execute the program code PROG_1 to generate a plurality of TCP packets 206, 208, 210, 212, 214, and may instruct the network interface circuit 116 to sequentially transmit the TCP packets 206, 208, 210, 212, 214 to the server 204, where a sequence number of the TCP packet 206 is represented by "Seq 1", a sequence number of the TCP packet 208 is represented by "Seq 2", a sequence number of the TCP packet 210 is represented by "Seq 3", a sequence number of the TCP packet 212 is represented by "Seq 4", and a sequence number of the TCP packet 214 is represented by "Seq 5". When the server 204 successfully receives the TCP packet 206, the processor 124 of the server 204 may execute the program code PROG_2 to generate a TCP packet 216 as an ACK packet corresponding to the TCP packet 206, and may instruct the network interface circuit 126 to return the TCP packet 216 to the client 202. For example, the TCP packet 216 is an ACK packet that carries an ACK number "ACK 1". The client 202 successfully receives the TCP packet (ACK packet) 216 via the network interface circuit 116. The time difference between a time point when the client 202 sends the TCP packet 206 and a time point when the client 202 receives the corresponding ACK packet from the server 204 may be called round trip time (RTT). As shown in FIG. 2, the next TCP packet 208 transmitted from the client 202 is lost during the network transmission process, so the server 204 does not successfully receive the TCP packet 208. When the server 204 successfully receives the TCP packet 210 later, the server 204 follows the modified TCP flow proposed by the present invention, and does not transmit an ACK packet that carries the ACK number "ACK 1" again in response to receiving the TCP packet 210, for triggering the client 202 to initiate re-transmission of the TCP packet 208. Instead, the server 204 directly responds with a corresponding TCP packet 218 after receiving the TCP packet 210. That is, the processor 124 of the server 204 may execute the program code PROG_2 to generate the TCP packet 218 as an ACK packet corresponding to the TCP packet 210, and may instruct the network interface circuit 126 to return the TCP packet 218 to the client 202. For example, the TCP packet 218 is an ACK packet that carries an acknowledgment number "ACK 3". It should be noted that, before the network interface circuit 116 of the client 202 successfully receive the TCP packet (ACK packet) 218, the network interface circuit 116 of the client 202 does not receive an ACK packet corresponding to the TCP packet 208; and when the network interface circuit 116 of the client 202 successfully receive the TCP packet (ACK packet) 218, the client 202 deems that TCP packets 206, 208, and 210 are all successfully received by the server 204. In this way, even though the TCP packet 208 is actually lost during the network transmission process, the client 202 does not initiate re-transmission of the TCP packet 208. Afterwards, the server 204 successfully receives TCP packets 212 and 214. When the server 204 returns a corresponding TCP packet 220 (e.g., an ACK packet that carries an ACK number "ACK 5") to the client 202 in response to receiving the TCP packet 214, the client 202 is notified that the sequentially transmitted TCP packets 206, 208, 210, 212, and 214 are all received by the server 204.

As mentioned above, according to the modified TCP flow proposed by the present invention, the server 204 does not request TCP packet re-transmission from the client 202 even though a TCP packet transmitted from the client 202 is actually lost. In addition, the server 204 returns an ACK packet to the client 202 according to the largest sequence number among sequence numbers of all TCP packets currently received by the server 204, which ensures that the client 202 does not initiate any TCP packet re-transmission during a period in which a network speed test (which at least includes an upload rate test) is running. In this way, TCP performance is protected from being affected by the network latency. In other words, even though the RTT becomes larger, the TCP performance does not degrade. Hence, with the help of the modified TCP flow proposed by the present invention, the upload rate test can accurately measure an actual upload rate of user's network under a variety of environments with different kinds of network latency.

When the processor 114 of the client 202 (computer device 102) executes the program code PROG_1 (e.g., program code of the network speed test software (client edition) that is a part of the program code PROG_1) to start the network speed test (which at least includes an upload rate test), the final network speed test result (which at least includes an upload rate test result) is reported by the client 202 (computer device 102) eventually. However, according to the modified TCP flow proposed by the present invention, the server 204 does not request any TCP packet re-transmission from the client 202. As a result, the client 202 may not be aware of how many TCP packets are lost during the network transmission process, and may also not be aware of an actual data amount of TCP packets received by the server 204. To address this issue, the present invention further proposes an improvement of an ACK packet (which is a TCP packet that carries an ACK number) that is returned by the server 204. In this way, the message included in each ACK packet (which is a TCP packet that carries an ACK number) that is returned by the server 204 has an additional session layer content included therein. For example, the processor 124 of the server 204 may execute the program code PROG_2 (e.g., program code of the network speed test software (server edition) that is a part of the program code PROG_2) to add the session layer content to the message, and then the processor 124 of the server 204 may execute the program code PROG_2 (e.g., program code of the OS that is a part of the program code PROG_2) to add a TCP header for generating a TCP packet as an ACK packet and may instruct the network interface circuit 126 to transmit the ACK packet (which includes the session layer content) to the client 202, such that the client 202 can refer to the information carried by the session layer content to compute a network speed of a network used by the client 202. For example, the session layer content may be arranged in the following format, but the present invention is not limited thereto.

| 3 bytes | 1 byte | 4 bytes | 1 byte | 1 byte |
|---------|--------|---------|--------|--------|
| Len | . | value | \r | \n |
| | . | | | |
| | . | | | |

Figure 3:
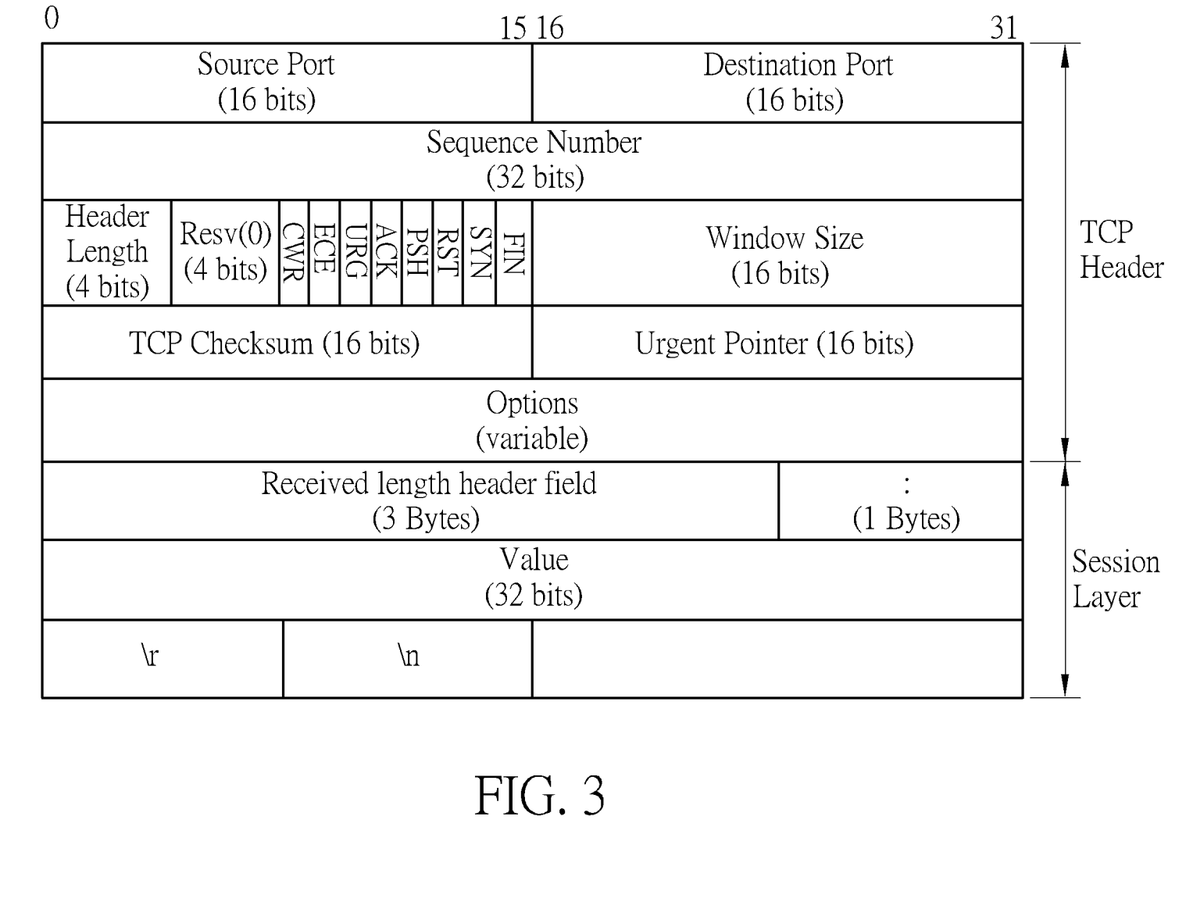
FIG. 3 is a diagram illustrating a TCP packet format that includes a session layer content according to an embodiment of the present invention.

Please refer to FIG. 3. FIG. 3 is a diagram illustrating a TCP packet format that includes a session layer content according to an embodiment of the present invention. In this embodiment, the TCP header is immediately followed by the session layer content. Since the TCP header format is known by those skilled in the art, further description is omitted here for brevity. Regarding the session layer content, a value recorded in a 4-byte (32-bit) field is used to indicate a data amount of TCP packets actually received by the server 204 until the current time point. Hence, the processor 114 of the client 202 may execute the program code PRIG_1 (e.g., program code of the OS that is a part of the program code PROG_1) to parse the ACK packet (which is a TCP packet that carries an ACK number) for obtaining this information. Next, the processor 114 of the client 202 may execute the program code PRIG_1 (e.g., program code of the network speed test software (client edition) that is a part of the program code PROG_1) to compute an upload rate of the network according to the data amount of TCP packets actually received by the server 204 until the current time point and the elapsed time since the start of the network speed test.

Figure 4:
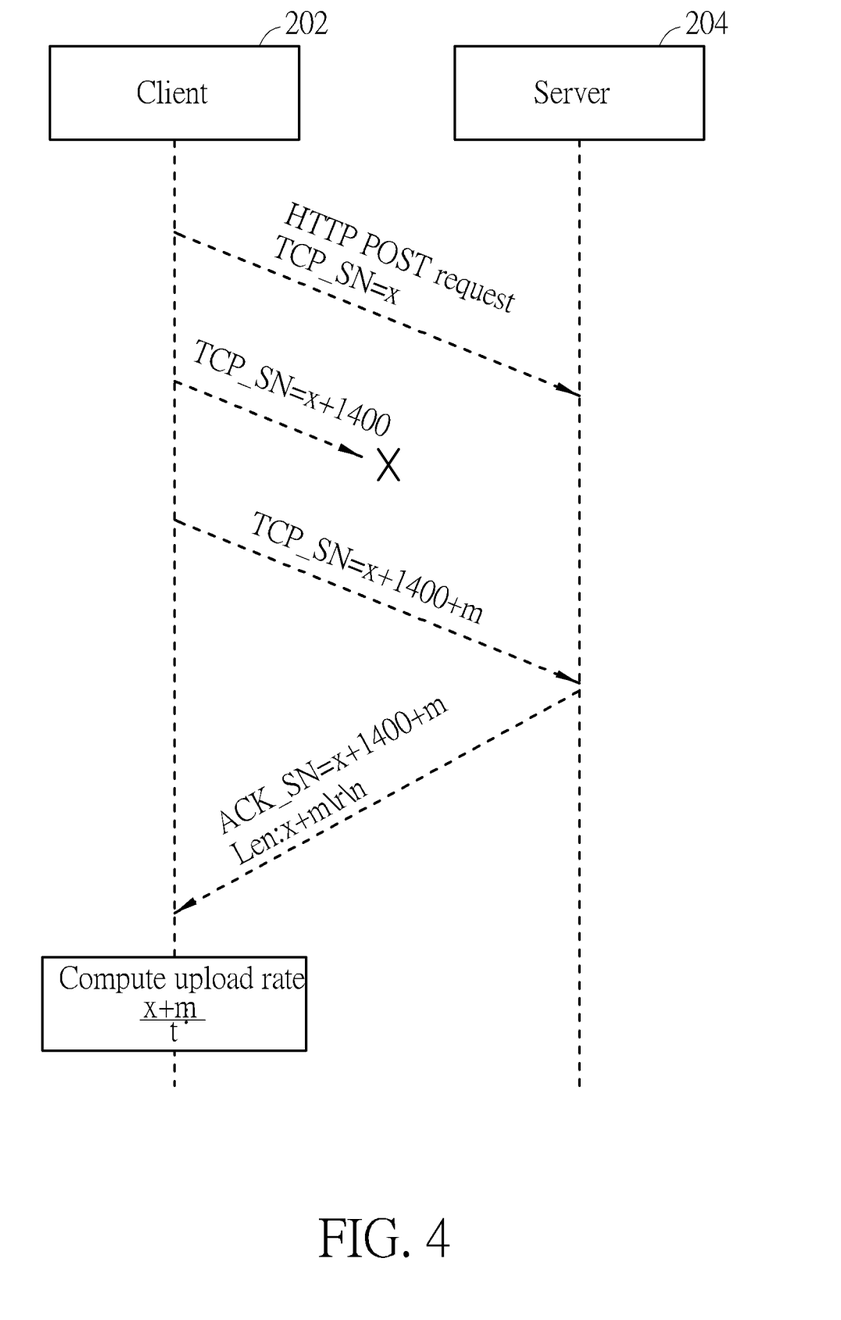
FIG. 4 is a sequence diagram illustrating an upload rate test according to an embodiment of the present invention.

Please refer to FIG. 4. FIG. 4 is a sequence diagram illustrating an upload rate test according to an embodiment of the present invention. The client (e.g., HTTP client) 202 may be the computer device 102 shown in FIG. 1, and the server (e.g., HTTP server) 204 may be the computer device 104 shown in FIG. 1. When the processor 114 of the client 202 (computer device 102) executes the program code (e.g., program code of the network speed test software (client edition) that is a part of the program code PROG_1) to start the network speed test (which at least includes an upload rate test), the client 202 transmits an HTTP POST request to the server 204 so as to transmit a plurality of TCP packets to the server 204 for upload rate test. In this embodiment, the sequence number of the first TCP packet transmitted by the client 202 (computer device 102) is x (i.e., TCP_SN=x). During a period in which the network speed test is running, a TCP packet transmitted from the client 202 (computer device 102) is lost. For example, a TCP packet with a sequence number of x+1400 (i.e., TCP_SN=x+1400) is not successfully received by the server 204 (computer device 104). As mentioned above, the server 204 (computer device 104) does not request re-transmission of the TCP packet with the sequence number of x+1400 (i.e., TCP_SN=x+1400) from the client 202 (computer device 102). When a TCP packet (which has a sequence number of x+1400+m, i.e., TCP_SN=x+1400+m) that is later transmitted from the client 202 (computer device 102) is successfully received by the server 204 (computer device 104), the server 204 (computer device 104) employs the TCP packet format shown in FIG. 3 to return an ACK packet in response to receiving the TCP packet (which has the sequence number of x+1400+m). In addition to a TCP header which carries an ACK number (e.g., ACK_SN=x+1400+m), the ACK packet further includes a session layer content used to indicate a data amount of TCP packets actually received by the server 204 until the current time point (e.g., Len: x+m \r \n). Hence, when the client 202 (computer device 102) receives this ACK packet, the client 202 (computer device 102) can parse the session layer content (e.g., Len: x+m \r \n) to know the data amount of TCP packets actually received by the server 204 until the current time point, and can compute the upload rate $$\left(\text{e.g., } \frac{x+m}{t}\right)$$

of a network used by the client 202 (computer device 102) through dividing the data amount of TCP packets (e.g., x+m) by the elapsed time (e.g., t).

As mentioned above, to achieve the flow control, the client 202 (computer device 102) operating in the upload rate test scenario acts as a TX end and transmits TCP packets according to a send window, and the server 204 (computer device 104) operating in the upload rate test scenario acts as an RX end and receives TCP packets according to a receive window. As shown in FIG. 3, a value recorded in the Window Size field of the TCP header indicates the size of the receive window that can be used by the RX end to control the packet flow and inform the TX end of the number of receive buffers currently available for receiving TCP packets. Changing the receive window size can be used to control the flow at the TX end. If the RX end is too busy or is unable to handle a lot of incoming TCP packets in time, the RX end can actively decrease the receive window and notify the TX end through the Window Size field included in the ACK packet. On the other hand, the RX end can actively increase the receive window and notify the TX end through the Window Size field included in the ACK packet. Since the network speed test does not care about integrity of the data contents, there is no need to rely on the re-transmission mechanism provided by a normal TCP flow for ensuring integrity and reliability of TCP packets transmitted over the network. In some embodiments of the present invention, since the server 204 (computer device 104) acts as an RX end under an upload rate test scenario, the server 204 (computer device 104) may make a value recorded in the Window Size field of the ACK packet maintain at the maximum receive window size of the server 204 (computer device 104). That is, during a period in which the network speed test is running (which at least includes a period in which an upload rate test is running), the Window Size field of each of the ACK packets returned from the server 204 (computer device 104) to the client 202 (computer device 102) may be set by a same value (e.g., the maximum receive window size of the server 204 (computer device 104)). Since the server 204 (computer device 104) increases its receive window size to the maximum value, the client 202 (computer device 102) can maintain a higher packet transmission speed, thereby improving the upload rate test result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer device comprising:
   a network interface circuit, arranged to receive a first transmission control protocol (TCP) packet from another computer device, wherein the first TCP packet comprises a TCP header and a session layer content following the TCP header;
   a storage device, arranged to store a program code; and
   a processor, arranged to load and execute the program code to perform following operation:
      computing a network speed of a network used by the computer device according to information carried by the session layer content.

2. The computer device of claim 1, wherein the processor is further arranged to execute the program code to perform following operation:
   instructing the network interface circuit to transmit a plurality of second TCP packets to the another computer device;
   wherein the information carried by the session layer content further comprises a data amount of second TCP packets actually received by the another computer device.

3. The computer device of claim 1, wherein the processor is further arranged to execute the program code to perform following operation:
   instructing the network interface circuit to transmit a second TCP packet to the another computer device;
   wherein the first TCP packet is an acknowledgement (ACK) packet corresponding to the second TCP packet.

4. The computer device of claim 3, wherein during a period in which the computer device performs a network speed test, a window field included in each first TCP packet that is transmitted from the another computer device and received by the computer device maintains at a same value.

5. The computer device of claim 3, wherein the processor is further arranged to execute the program code to perform following operation:
   before transmitting the second TCP packet to the another computer device, instructing the network interface circuit to transmit another second TCP packet to the another computer device;
   wherein before the network interface circuit receives the ACK packet corresponding to the second TCP packet, the network interface circuit does not receive an ACK packet corresponding to the another second TCP packet.

6. The computer device of claim 1, wherein during a period in which the computer device performs a network speed test, the computer device does not perform any TCP packet re-transmission.

7. A computer device comprising:
- a network interface circuit, arranged to sequentially receive a first transmission control protocol (TCP) packet and another first TCP packet from another computer device, wherein the first TCP packet and the another first TCP packet have discontinuous sequence numbers;
- a storage device, arranged to store a program code; and
- a processor, arranged to load and execute the program code to perform following operation:
  - in response to receiving the another first TCP packet, instructing the network interface circuit to transmit a second TCP packet to the another computer device, wherein the second TCP packet is an acknowledgement (ACK) packet corresponding to the another first TCP packet.

8. The computer device of claim 7, wherein the second TCP packet comprises a session layer content.

9. The computer device of claim 8, wherein information carried by the session layer content comprises a data amount of first TCP packets transmitted from the another computer device and actually received by the computer device.

10. The computer device of claim 7, wherein the processor is further arranged to execute the program code to perform following operation:
- during a period in which the another computer device performs a network speed test, maintaining a window field included in each second TCP packet that is transmitted to the another computer device at a value equal to a maximum receive window size of the computer device.

11. A transmission control protocol (TCP) packet processing method employed by a computer device, comprising:
- receiving a first packet from another computer device, wherein the first TCP packet comprises a TCP header and a session layer content following the TCP header; and
- computing a network speed of a network used by the computer device according to information carried by the session layer content.

12. The TCP packet processing method of claim 11, further comprising:
- transmitting a plurality of second TCP packets to the another computer device;
- wherein the information carried by the session layer content further comprises a data amount of second TCP packets actually received by the another computer device.

13. The TCP packet processing method of claim 11, further comprising:
- transmitting a second TCP packet to the another computer device;
- wherein the first TCP packet is an acknowledgement (ACK) packet corresponding to the second TCP packet.

14. The TCP packet processing method of claim 13, wherein during a period in which the computer device performs a network speed test, a window field included in each first TCP packet that is transmitted from the another computer device and received by the computer device maintains at a same value.

15. The TCP packet processing method of claim 13, further comprising:
- before transmitting the second TCP packet to the another computer device, transmitting another second TCP packet to the another computer device;
- wherein before the ACK packet corresponding to the second TCP packet is received, no ACK packet corresponding to the another second TCP packet is received.

16. The TCP packet processing method of claim 11, wherein during a period in which the computer device performs a network speed test, no TCP packet re-transmission is performed.

17. A transmission control protocol (TCP) packet processing method employed by a computer device, comprising:
- sequentially receiving a first TCP packet and another first TCP packet from another computer device, wherein the first TCP packet and the another first TCP packet have discontinuous sequence numbers; and
- in response to receiving the another first TCP packet, transmitting a second TCP packet to the another computer device, wherein the second TCP packet is an acknowledgement (ACK) packet corresponding to the another first TCP packet.

18. The TCP packet processing method of claim 17, wherein the second TCP packet comprises a session layer content.

19. The TCP packet processing method of claim 18, wherein information carried by the session layer content comprises a data amount of first TCP packets transmitted from the another computer device and actually received by the computer device.

20. The TCP packet processing method of claim 17, further comprising:
- during a period in which the another computer device performs a network speed test, maintaining a window field included in each second TCP packet transmitted to the another computer device at a value equal to a maximum receive window size of the computer device.

* * * * *